(12) United States Patent
Ausserlechner (10) Patent No.: US 12,000,714 B2
(45) Date of Patent: Jun. 4, 2024

(54) SENSING OF A ROTATIONAL ANGLE (71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 421 days.

(21) Appl. No.: 16/948,476

(22) Filed: Sep. 21, 2020

(65) Prior Publication Data

US 2021/0095999 A1      Apr. 1, 2021

(30) Foreign Application Priority Data

Oct. 1, 2019   (DE) .......................... 102019126430.8

(51) Int. Cl.
| | | |
|---|---|---|
| *G01D 5/14* | (2006.01) | |
| *G01B 7/30* | (2006.01) | |
| *G01D 5/16* | (2006.01) | |

(52) U.S. Cl.
CPC .............. *G01D 5/145* (2013.01); *G01B 7/30* (2013.01); *G01D 5/16* (2013.01)

(58) Field of Classification Search
CPC ............. G01B 7/30; G01D 5/145; G01D 5/16
See application file for complete search history.

(56) References Cited

U.S. PATENT DOCUMENTS

| | | | | |
|---|---|---|---|---|
| 2005/0007104 A1* | 1/2005 | Lequesne | ............... | G01D 5/145 324/207.25 |
| 2016/0138940 A1 | 5/2016 | Kurmaniak et al. | | |
| 2016/0216132 A1* | 7/2016 | Ausserlechner | ......... | G01D 5/14 |
| 2019/0170497 A1 | 6/2019 | Ausserlechner | | |
| 2020/0271479 A1* | 8/2020 | Wang | ..................... | G01D 5/145 |

FOREIGN PATENT DOCUMENTS

| | | |
|---|---|---|
| DE | 102015115247 A1 | 3/2016 |
| EP | 1577182 A1 | 9/2005 |
| FR | 1339956 A | 10/1963 |

OTHER PUBLICATIONS

Tumanski, "Induction Coil Sensors—a Review," Mar. 2007 [Retrieved from http://www.tumanski.x.pl/coil.pdf].
"Out of Shaft with magnetic 3D sensor," Infineon Technologies AG, Jul. 31, 2018 [Retrieved from https://www.infineon.com/dgdl/Infineon-Out_of_Shaft-AN-v01_00-EN.pdf?fileId=5546d46265257de801653898ba536074].

* cited by examiner

*Primary Examiner* — Reena Aurora
(74) *Attorney, Agent, or Firm* — Harrity & Harrity, LLP (57) ABSTRACT

A rotation angle sensing device is provided, which comprises (i) a magnetic field source that is capable of being mechanically coupled to a rotatable shaft, wherein the shaft is rotatable around a rotation axis, wherein the magnetic field source provides a magnetization which is substantially parallel to the rotation axis and not rotationally symmetric to the rotation axis, wherein the magnet field source comprises or is a permanent magnet; and (ii) at least two magnetic field sensor elements arranged to detect the magnetic field of the magnetic field source, wherein the at least two magnetic field sensor elements are located out of shaft and are placed at the same radial distance from the rotation axis. Also, a method for sensing a rotational angle is suggested.

21 Claims, 7 Drawing Sheets

SENSING OF A ROTATIONAL ANGLE

CROSS REFERENCE TO RELATED APPLICATION

This application claims priority to German Patent Application No. 102019126430.8 filed on Oct. 1, 2019, the content of which is incorporated by reference herein in its entirety.

BACKGROUND

In many applications it is not an option to directly access the end of a shaft for angle measurement purposes. As a solution, a magnetic 3D sensor can be used by measuring the X-Y (X-Z or Y-Z) components. The sensor is located out of the shaft, e.g. not on the rotation axis of the shaft. The shaft itself has a magnetic encoder with at least two poles (one referred as N, the other as S).

SUMMARY

Implementations described herein may improve existing solutions for sensing of a rotational angle of, e.g., a shaft.

The examples suggested herein may in particular be based on at least one of the following solutions. Combinations of the following features may be utilized to reach a result. The features of the method could be combined with any feature(s) of the device, apparatus or system or vice versa.

A rotation angle sensing device is suggested comprising:
- a magnetic field source that is capable of being mechanically coupled to a rotatable shaft, wherein the shaft is rotatable around a rotation axis;
    - wherein the magnetic field source provides a magnetization which is substantially parallel to the rotation axis and not rotationally symmetric to the rotation axis;
    - wherein the magnet field source comprises or is a permanent magnet;
- at least two magnetic field sensor elements arranged to detect the magnetic field of the magnetic field source;
    - wherein the at least two magnetic field sensor elements are located out of shaft and are placed at the same radial distance from the rotation axis.

The at least two magnetic field sensor elements are located out of shaft by not being rigidly attached to the shaft. The position of the at least two magnetic field sensor elements is fixed independently from the rotation of the shaft and the magnetic field source (which is coupled to the shaft).

The magnetization points in axial direction. Hence, the magnetized volume caused by the magnetic field source is not rotationally symmetric which results in a variation of the magnetic field in view of the rotation angle. This variation of the magnetic field is detected by the at least two magnetic field sensor elements.

According to an implementation, the magnetic field source is fixed on the shaft and the magnetic field source comprises at least one of the following:
- a permanent magnet;
- a ring magnet;
- an injection molded ferrite.

The magnetic field source may be directly or indirectly, e.g., via a holder, fixed to the shaft.

According to an implementation, the magnetic field source comprises at least one region of homogeneous axial magnetization, which is not rotationally symmetric to the rotation axis.

According to an implementation, the magnetic field source has a homogenous magnetization in a direction along its thinnest dimension.

The thinnest dimension may in particular be the thickness of the magnetic field source. This allows magnetizing a large ring magnet such that it provides a substantially homogenous magnetic field.

For example, a permanent magnet with a diameter of more than 15 mm is difficult to magnetize such that it supplies a homogenous magnetic field. Therefore, it may be beneficial to use a ring magnet as magnetic field source, which is magnetized along its thickness. The thickness may be in a range between 1 mm and 20 mm.

This approach is substantially different from prior art solutions, which magnetize permanent magnets not along its thinnest dimension, but along its elongated direction.

According to an implementation, the at least two magnetic field sensor elements are located in the same plane, which is perpendicular to the rotation axis.

According to an implementation, at least three magnetic field sensor elements are substantially equally distributed across a circle around the rotation axis.

For example, N magnetic field sensor elements may be provided with N being at least three and the N magnetic field sensor elements are positioned on the circle around the rotation axis with an azimuthal spacing amounting to 360°/N.

According to an implementation, the at least two magnetic field sensor elements are mounted on the same component board.

According to an implementation, the component board has a central bore to accommodate the shaft and an aperture to mount the component board in a diametrical direction.

Advantageously, due to the aperture, there is no need to pull the component board over the end of the shaft and therefore to demount the shaft or conduct a costly (dis)assembly.

According to an implementation,
- the magnetic field source has a mid-plane that is arranged perpendicular to the rotation axis,
- the geometry of the magnetic field source shows mirror symmetry with regard to this mid-plane.

According to an implementation, the at least two magnetic field sensor elements are positioned on the mid-plane at a radial clearance to the magnetic field source.

According to an implementation, the center of gravity of the respective magnetic field sensor element is positioned on the mid-plane.

According to an implementation, at least two magnetic field sensor elements are positioned not on the mid-plane, but above or below this mid-plane at a radial distance from the rotation axis which is smaller than half of the maximum diameter of the magnetic field source, thereby having an axial clearance to the top and/or bottom surfaces of the rotatable magnet.

According to an implementation, the axial or radial clearance is between 1 mm and 5 mm.

According to an implementation, the magnetic field source has at least one of the following characteristics:
- a maximum diameter between 10 mm and 100 mm;
- a thickness in axial direction below 10 mm;
- a constant thickness in axial direction or a varying thickness in axial direction;
- a center of gravity that lies on the rotation axis.

According to an implementation, the magnetic field source comprises
- at least one first portion of homogeneous axial magnetization and
- at least one second portion of less, different or no magnetization,
- wherein the at least first portion and the at least one second portion are not rotational symmetric with regard to the rotation axis.

According to an implementation, the magnetic field source comprises
- at least one first portion of a first homogeneous axial magnetization and
- at least one second portion of a second homogeneous axial magnetization,
- wherein the at least first portion and the at least one second portion are magnetized in anti-parallel direction and
- wherein the at least first portion and the at least one second portion are not rotational symmetric with regard to the rotation axis.

According to an implementation,
- the at least two magnetic field sensor elements are arranged to provide output signals that are proportional to the axial component of the magnetic field of the magnetic field source;
- the device comprises a processing device that is arranged to combine the output signals of the at least two magnetic field sensor elements to determine a rotational angle of the shaft.

The rotational position of the shaft determined by the processing device may be an estimate of the true rotational position of the shaft.

According to an implementation, the processing device is arranged to determine a corrected rotation angle according to $$\varphi''=\varphi'+f(\varphi'),$$

wherein $\varphi''$ is the corrected rotation angle of the shaft, $\varphi'$ is the previously determined rotational angle and $f(\varphi')$ is a correction term, which considers N periods in the full 360° revolution of the shaft, with N being the number of the at least two magnetic field sensor elements.

The processing device may comprise at least one of the following: a processor, a microcontroller, a hard-wired circuit, an ASIC, an FPGA, a logic device.

According to an implementation, the magnetic field sensor element may be one of the following:
- a magnetoresistive (MR) sensor;
- an anisotropic magnet resistance (AMR) sensor;
- a giant magnetoresistance (GMR) sensor;
- a tunnel-magnetoresistance (TMR) sensor;
- a Hall plate;
- a vertical Hall effect device.

Also, a method is provided for sensing a rotational angle of a shaft that is arranged rotatably around a rotation axis, wherein a magnetic field source is capable of being mechanically coupled to a rotatable shaft, wherein the magnetic field source provides a magnetization which is substantially parallel to the rotation axis and not rotationally symmetric to the rotation axis, wherein the magnet field source comprises or is a permanent magnet, the method comprising:
- detecting the magnetic field of the magnetic field source by at least two magnetic field sensor elements, wherein the at least two magnetic field sensor elements are located out of shaft and are placed at the same radial distance from the rotation axis.

According to an implementation, the method further comprises:
- providing output signals by the at least two magnetic field sensor elements, which output signals are proportional to the axial component of the magnetic field of the magnetic field source;
- combining the output signals of the at least two magnetic field sensor elements to determine a rotational angle of the shaft.

BRIEF DESCRIPTION OF THE DRAWINGS

Implementations are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
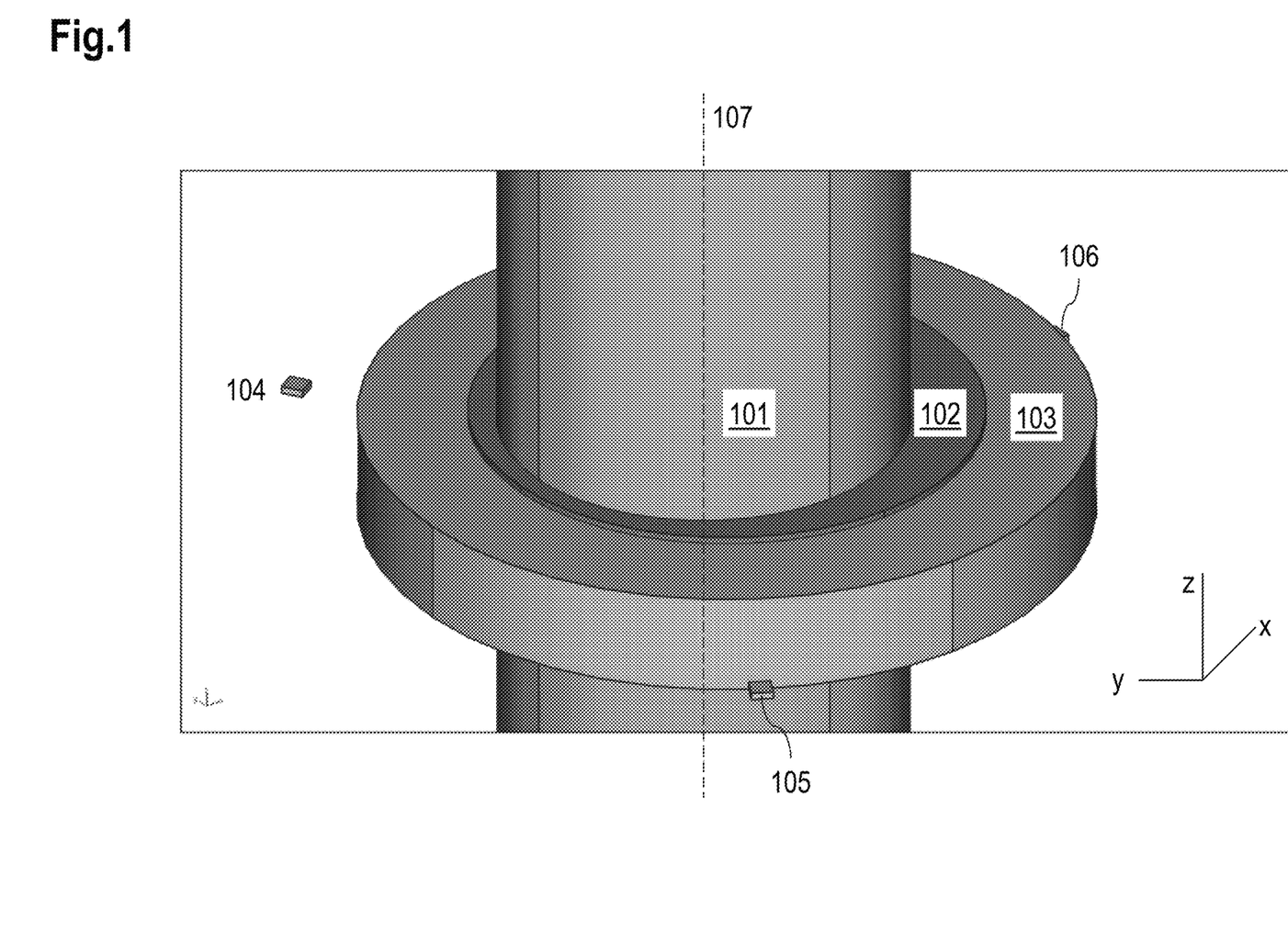
FIG. 1 shows an example implementation of a sensor system with an eccentricity in an isometric view.

FIG. 1 shows an example implementation of a sensor system with an eccentricity in an isometric view. The sensor system comprises a shaft 101 that is rotatable around a rotation axis 107 and a holder 102 that attaches a permanent magnet 103 with a ring shape to the shaft 101. The magnetic sensor 106 is located at an azimuthal position amounting to 0°, the magnetic sensor 104 is located at an azimuthal position amounting to +120° and the magnetic sensor 105 is located at an azimuthal position amounting to −120°.

FIG. 1 also shows an example Cartesian coordinate system, wherein the z-axis is in the direction of the rotation axis 107 and the x-y-plane is orthogonal to the rotation axis 107.

The magnet 103 may preferably be homogeneously magnetized in axial direction. The center axis of the shaft 101 is identical with the rotation axis 107. The sensor elements 104 to 106 are placed symmetrical around the rotation axis, e.g. their radial distance Rs to the rotation axis is identical, they are positioned on a regular grid of 120° and they are positioned in an axial mid-plane of the magnet at z=0.

Figure 2:
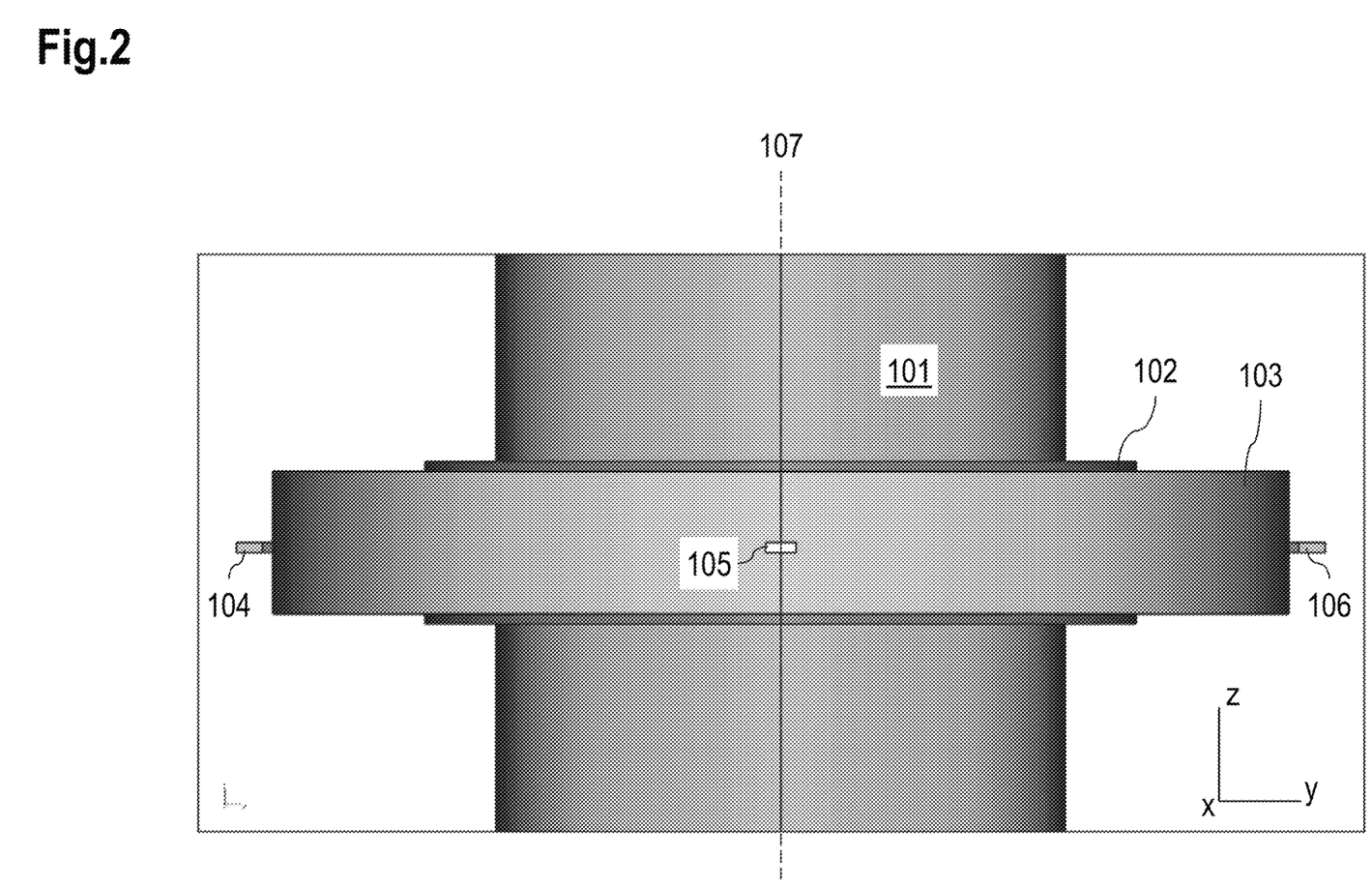
FIG. 2 shows a side view of the sensor system depicted in FIG. 1.
Figure 3:
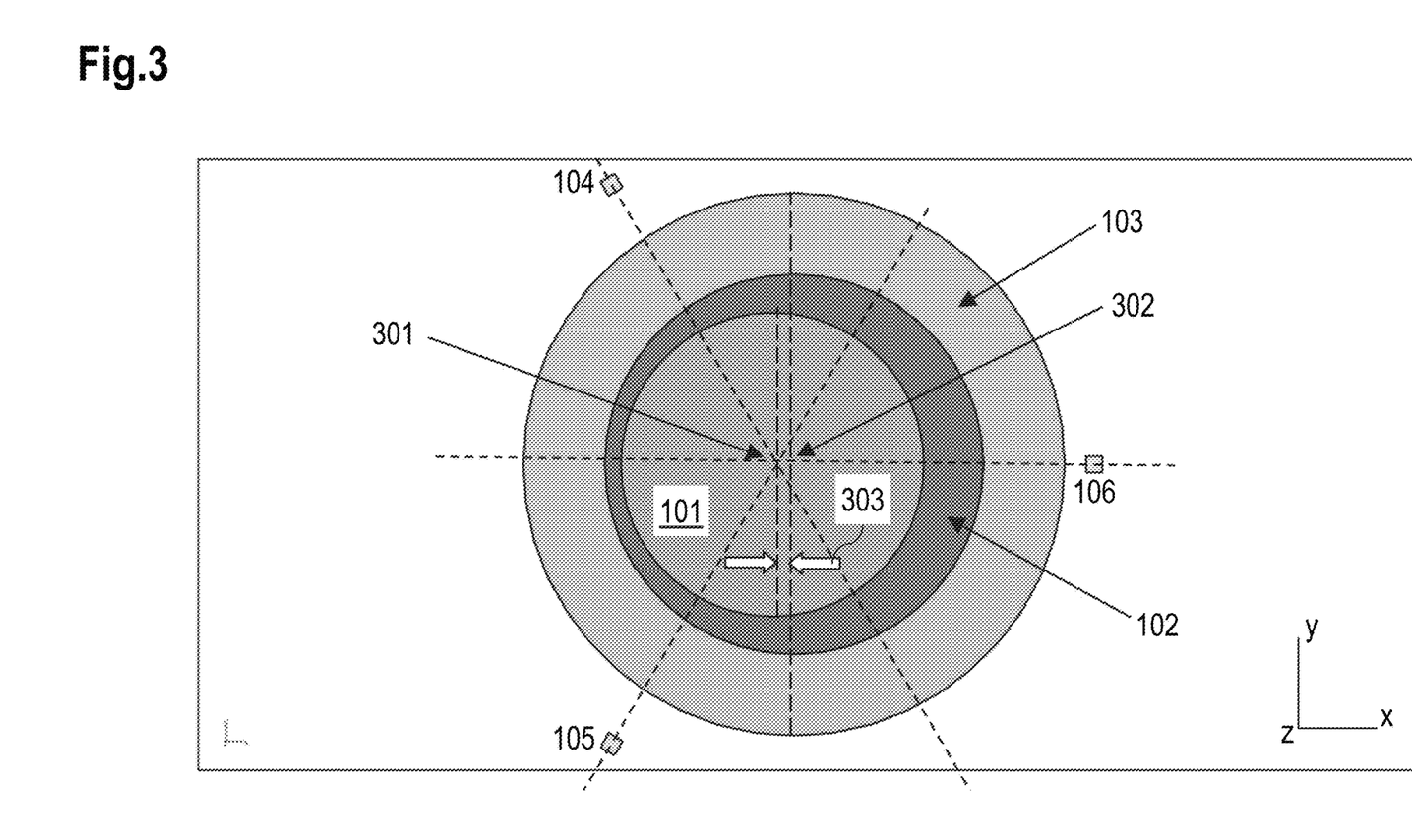
FIG. 3 shows a sectional view of the x-y-plane through the magnet of the sensor system of FIG. 1.

FIG. 2 shows a side view of the sensor system and FIG. 3 shows a sectional view of the x-y-plane through the magnet 103. FIG. 3 also visualizes a center 301 of the sensor elements 104 to 106 (which is also the center of the shaft and hence the rotation axis 107) and a center 302 of the magnet 103. The difference between the center 301 and the center 302 leads to an eccentricity 303.

The sensor elements 104 to 106 each responds to an axial magnetic field component Bz. Each of the sensor elements may preferably comprise Hall plates. In such case, each of the sensor elements represent dies or chips of the semiconductor Hall plate.

The ring magnet 103 is preferably rotationally symmetric around its center axis and has an outer diameter amounting to 2*Rm. However, the center axis of the magnet 103 is mounted eccentrically to the rotation axis 107 (by an amount e).

The center axis of the magnet 103 and the rotation axis 107 are both parallel to each other. The magnet 103 is fixed to the shaft 101 via the holder 102 so that they rotate coherently.

When the shaft 101 rotates around its rotation axis 107, a clearance CL of each of the sensor elements 104 to 106 to the magnet 103 varies due to this eccentricity 303.

The Minimum Clearance Amounts To $$CL_{min}=Rs-Rm-e$$

and the maximum clearance amount to $$CL_{max}=Rs-Rm+e,$$

wherein Rs is the radial distance of the sensor element to the rotation axis 107, Rm is the outer radius of the ring magnet 103 and e is the eccentricity 303.

As the magnetic field Bz decays with an increasing distance from the magnet, the magnetic field fluctuates on each sensor element. The sensors 104 to 106 detect the magnetic field, which can then be combined according to $$CO = Bz(0°) - \frac{Bz(120°) + Bz(-120°)}{2}$$

and $$SI = \frac{\sqrt{3}}{2} \cdot (Bz(120°) - Bz(-120°)).$$

The two numbers CO and SI can be interpreted as $\xi$- and $\eta$-components of a point, which rotates coherently with the shaft 101. The angle of a pointer to any fixed reference axis in a $(\xi, \eta)$-space is an estimated rotation angle $\varphi'$. If the $\xi$-axis is chosen as reference axis, the following applies:

$$\varphi'=\arctan 2(CO;SI),$$

wherein arctan 2 is the unique arctan over 360°. Usually, the rotation angle $\varphi'$ differs from a true rotation angle $\varphi$ by an error, which stems from the nonlinear decay of the magnetic field Bz versus the radial distance. Hence, the sensor system may utilize a correction formula and/or a look-up table to improve the determination of the rotation angle. For example, a correction function $f(\varphi')$ may be applied on the estimated (potentially incorrect) rotation angle $\varphi'$ resulting in an improved (corrected) rotation angle $\varphi''$:

$$\varphi''=\varphi'+f(\varphi').$$

Example:

The magnet 103 has an inner diameter of 35 mm, an outer diameter of 50 mm and 7 mm thickness in axial direction. The magnet 103 is mounted on the shaft 101 with an eccentricity 303 amounting to 1 mm.

The sensor elements 104 to 106 are placed such that their sensitive spots are on a circle with 56 mm diameter around the rotation axis 107.

Figure 4:
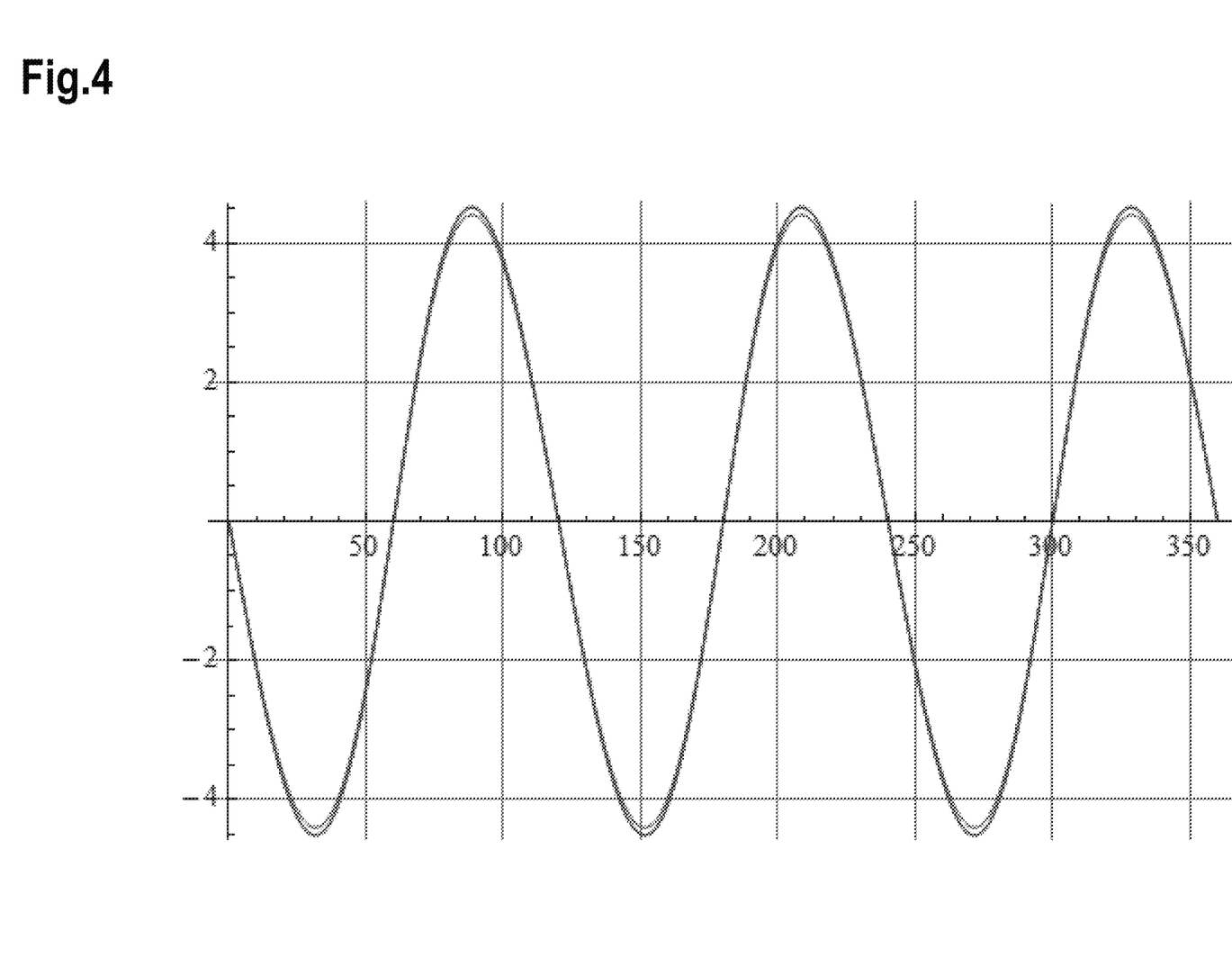
FIG. 4 shows a diagram depicting on the vertical axis a deviation of a rotation angle $\varphi'$ from the true rotation angle $\varphi$.

FIG. 4 shows a diagram depicting on the vertical axis a deviation of a rotation angle $\varphi'$ from the true rotation angle $\varphi$. The horizontal axis shows a rotational position in degrees.

The curves show sensors that are placed in the mid-plane at z=0, z=1 mm and z=2 mm due to an axial play.

The systematic error hence varies between ±4.5°. This systematic error can be measured on prototype systems in a laboratory characterization, and it can be plotted as a function over $\varphi'$ (instead of $\varphi$). This function over $\varphi'$ can be parametrized with a small number of parameters. For example, it can be expanded into a Fourier series of the argument $\varphi'$ like $$f(\varphi')=k \cdot \sin(3\varphi'),$$

wherein the number k may depend on
  the magnet, e.g., its shape, magnetization, material and/or recoil permeability,
  the eccentricity and
  the number of regularly spaced sensor elements, e.g., at least two, in particular three or more sensor elements.
The number k may amount to, e.g., −4.5°.
Eventually, the corrected rotation angle $$\varphi''=\varphi'+f(\varphi'),$$

e.g., $$\varphi''=\varphi'+k \cdot \sin(3\varphi')=-4.5° \cdot \sin(3\varphi')$$

can be determined.

As an option, an offset-calibration may be applied for the signals CO and SI. In case the signals CO and SI have an offset, e.g. they are not centered around zero, the system may be configured to determine maxima and minima of the curves for several revolutions, and calculate the offset as $$\text{offset}=\frac{1}{2}(\text{max}+\text{min}).$$

Then, this offset may be subtracted. Such offset-calibration may be used to further improve the accuracy of the rotation angle determined.

It is another option to conduct an amplitude-calibration: The system may thus compute the amplitudes $$\frac{\text{max} - \text{min}}{2}$$

for both signals CO and SI. If the amplitudes are substantially different from each other (e.g., the difference is above a predefined threshold), the system may normalize the amplitudes to the same number by dividing each of the signals CO, SI by the value (max−min)/2 and by using the result the same way as the signals CO, SI without amplitude-calibration.

It is another option that an additional step is conducted prior to any other processing explained so far: The system may compute three signals U, V, W based on the signals Bz(0°), Bz(120°), Bz(−120°) as follows:

$$U=Bz(0°)-Bz(120°);$$

$$V=Bz(120°)-Bz(-120°);$$

$$W=Bz(-120°)-Bz(0°).$$

The advantage of using the signals U, V, W is that they are robust against interfering homogeneous external magnetic fields, because interferences are cancelled out by the subtractions. The system may use the signals U, V, W the same way as the signals Bz(0°), Bz(120°), Bz(−120°) have been used. Also, it is more robust to use the signals U, V, W for any kind of calibration.

Further Advantages and Implementations:

As shown in FIG. 1 to FIG. 3 above, the inner bore of the magnet 103 may be concentric to the magnet.

However, the inner bore of the magnet may also be concentric to the rotation axis. In this case the holder does not need to provide the eccentricity, because the magnet does this already.

The axial thickness of the magnet may be significantly (e.g., two times) larger than an axial play plus any axial mounting tolerances between the sensor element and the magnet. In practice, the magnet may preferably be thicker than 3 mm if the sensor elements are placed in the mid-plane of the magnet.

It is favorable to place the sensor elements in the mid-plane of the magnet, because there the magnetic field shows the highest symmetry. Hence, the magnetic field changes little if the sensor element slightly moves in z-direction (up or down).

Alternative Implementation: Sensor Elements Below (or Above) the Magnet

Figure 5:
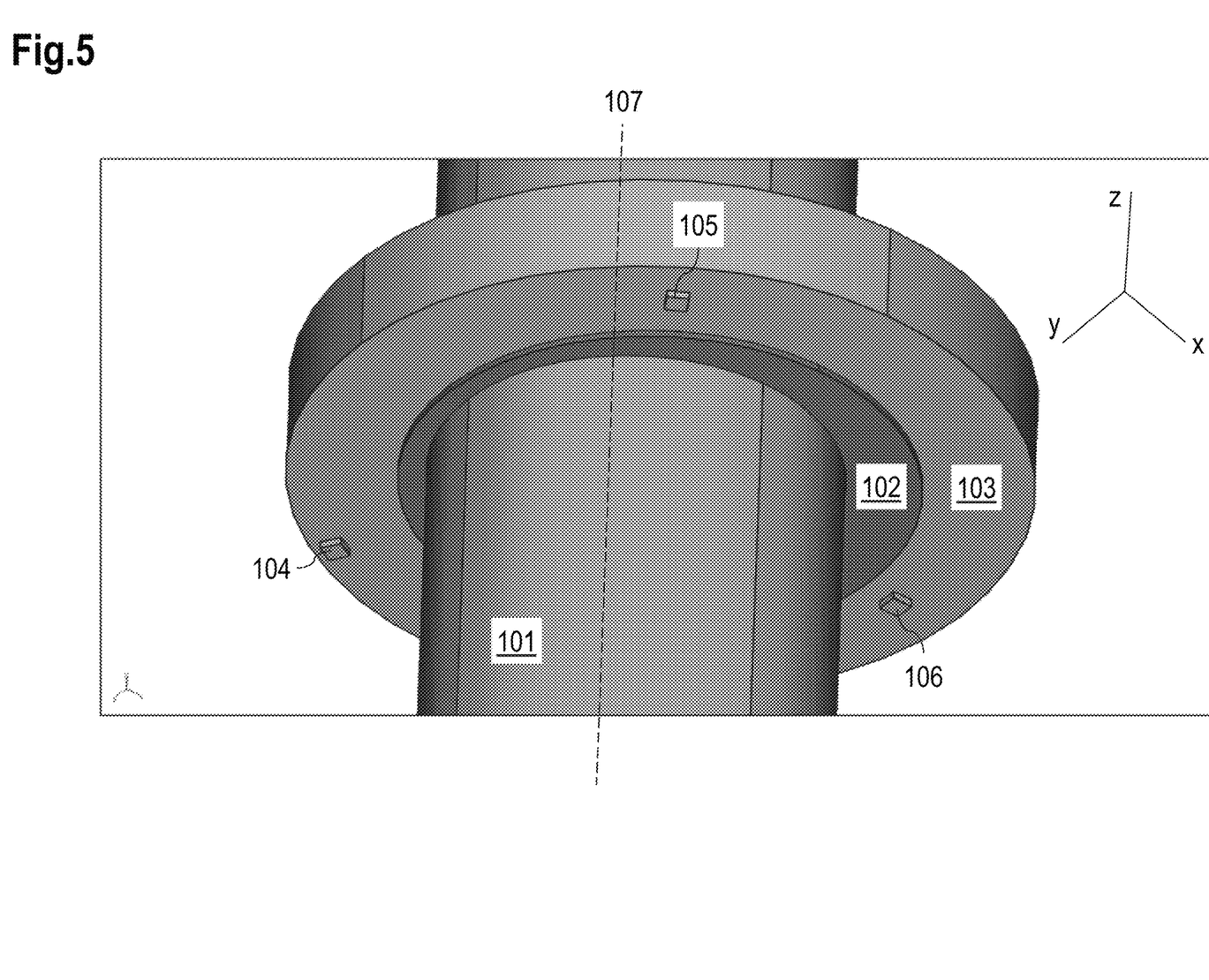
FIG. 5 shows an alternative implementation with regard to the implementation of FIG. 1 with the sensor elements located below the magnet.

FIG. 5 shows an alternative implementation with regard to the implementation shown in FIG. 1, wherein the sensor elements 104 to 106 are located below the magnet 103.

Figure 6:
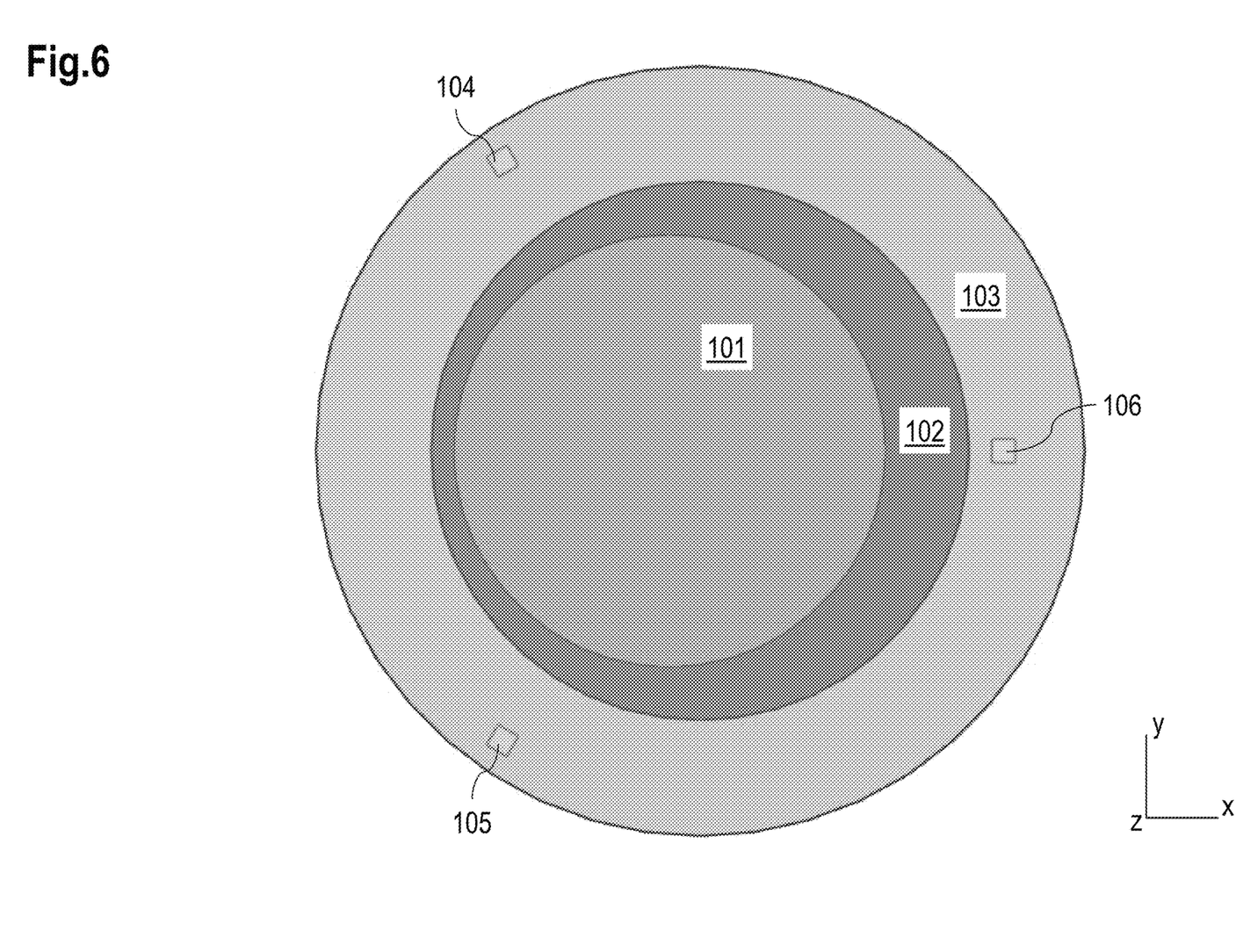
FIG. 6 shows a sectional view of the x-y-plane through the magnet according to the arrangement of FIG. 5.

FIG. 6 shows a sectional view of the x-y-plane through the magnet 103 according to the arrangement depicted in FIG. 5.

This example allows the magnet 103 to be thin in axial direction. For example, a thickness of the magnet amounting to 1 mm may suffice.

It is an option that the magnet 103 is mounted to a supporting layer, e.g., a steel-back as it is known from multipole-encoder wheels. In case of a steel-back it is favorable that the steel-back is rotationally symmetric with respect to the rotation axis and to the sensor elements. Then a homogeneous external magnetic disturbance generates identical disturbance on all sensor elements, which are cancelled out in the CO and SI signals or also in the U,V,W signals.

If the sensor elements 104 to 106 are placed below the magnet 103, their radial distance to the rotation axis 107 may be smaller than the radial distance of the outer perimeter of the magnet 103 to the rotation axis 107. Hence, the sensor elements may have an axial clearance instead of a radial clearance.

If the magnet has an eccentricity, this may have the disadvantage of a large centrifugal force if the shaft rotates at high rpm.

Example: Eccentric Magnetization

This effect can be mitigated or avoided by utilizing a magnet that shows rotational symmetry with regard to the rotation axis, but shows an eccentric magnetization, e.g. has only eccentric parts magnetized. The remaining parts of the magnet may not be magnetized (or do show a significant degree of magnetization) such that the dominant contribution to the magnetic field supplied by the magnet stems from its magnetized eccentric portion.

Further Examples and Advantages

Figure 7:
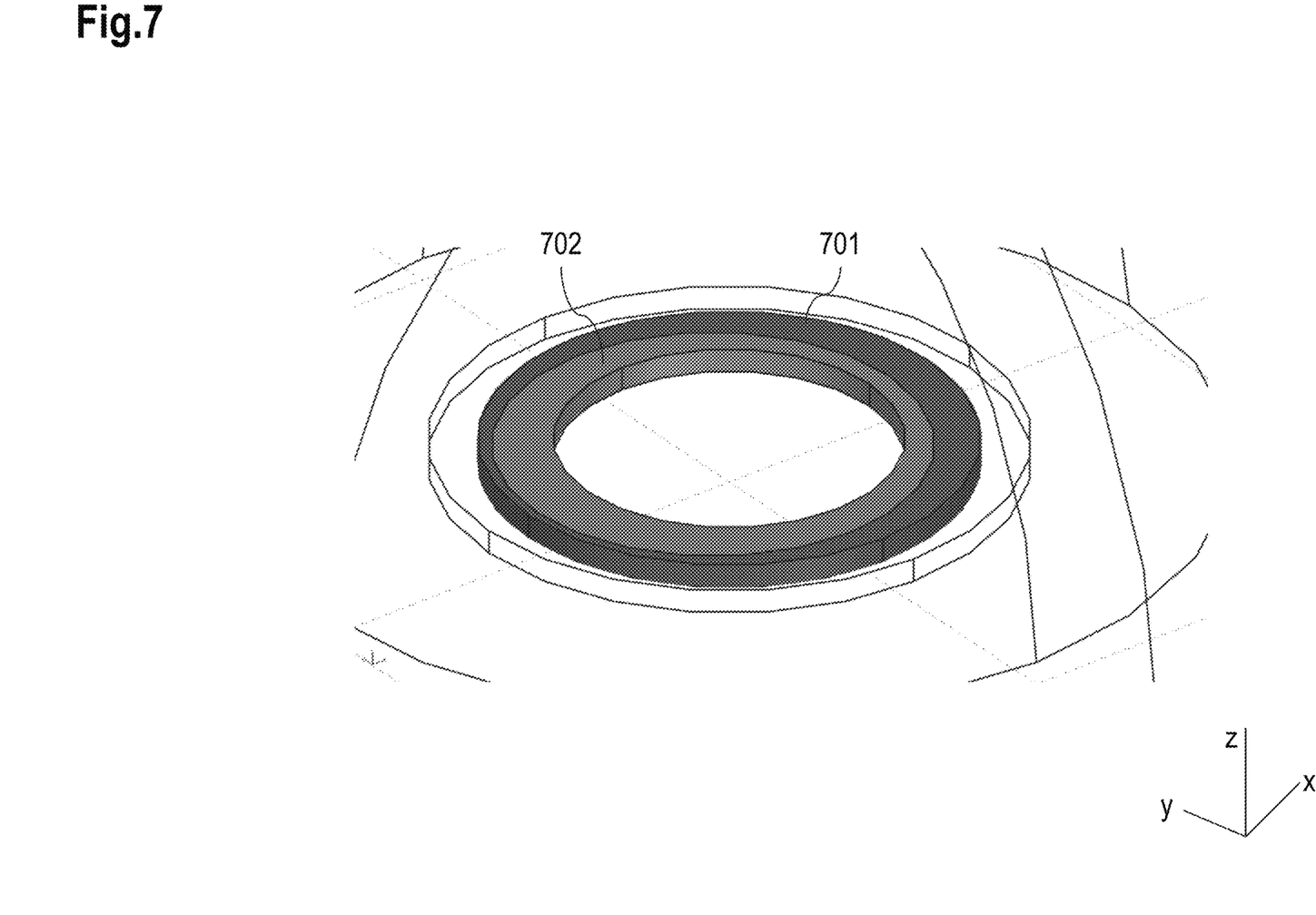
FIG. 7 shows an example magnet with only an eccentric portion of this magnet being magnetized.

FIG. 7 shows an example magnet with only an eccentric portion of this magnet being magnetized.

The magnet shown in FIG. 7 comprises a portion 701 and a portion 702, wherein only one portion is homogenously magnetized in axial direction (here z-direction) and the other portion is not magnetized. For example, the portion 702 may be homogenously magnetized and the portion 701 may not be magnetized.

It is also an option to magnetize both portions 701 and 702 of the magnet in opposite axial directions. The portion 702 may thus be magnetized upwards and the portion 702 may be magnetized downwards.

The cross section of the ring magnet is rectangular and may have a constant axial thickness. It is also an option to vary the thickness to shape the field pattern $Bz(\varphi)$ to become more similar to a sinusoidal shape, e.g. with no mean value and thus no offset, having no higher harmonics, only a fundamental frequency component that varies once over a range of 360°. Preferably, the shape of the magnet remains rotationally symmetric to avoid centrifugal forces acting on the magnet.

It is also an option that the geometry of the magnet deviates from any rotational symmetry shape in case such deviation does not create any or at least no significant centrifugal force. This may result in a criterion for the shape of the magnet that only the gravity center of the magnet is placed on the rotation axis. An example is an ellipsoidal magnet.

It is another option that an interface between the portion 701 and the portion 702, which may be parts with homogeneous magnetization in opposite axial direction, may be a cylinder with elliptical cross-section, whereby the cylinder axis is parallel to the rotation axis and shifted eccentrically to it by an amount ranging from 1 mm to 4 mm.

The magnet may comprise inexpensive material, e.g., ferrite, because the volume of the magnet is considerably large which on the other hand allows using material of rather weak magnetization.

In particular in combination with the supporting layer (e.g., steel-back) it is an option to use plastic-bound and/or rubber-bound magnetic layers as they are known, e.g., from multipole-encoder discs in ABS systems.

Although various example implementations of the implementation have been disclosed, it will be apparent to those skilled in the art that various changes and modifications can be made which will achieve some of the advantages of the implementation without departing from the spirit and scope of the implementation. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the implementation may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A rotation angle sensing device comprising:
   a magnetic field source that is capable of being mechanically coupled to a rotatable shaft via a holder,
       wherein the rotatable shaft is rotatable around a rotation axis,
       wherein the magnetic field source provides a magnetization which is substantially parallel to the rotation axis and not rotationally symmetric to the rotation axis,
       wherein the magnetic field source has a mid-plane that is arranged perpendicular to the rotation axis,
       wherein a geometry of the magnetic field source shows mirror symmetry with regard to the mid-plane, wherein the magnet field source comprises a permanent magnet; and at least two magnetic field sensor elements arranged to detect a magnetic field of the magnetic field source, wherein the at least two magnetic field sensor elements are located out of the rotatable shaft and are placed at a same radial distance from the rotation axis, and wherein the holder is configured to mount the magnetic field source to the rotatable shaft to create an eccentricity that is based on a center of the magnetic field source being offset from a center of the rotatable shaft, wherein the eccentricity is configured to cause a distance between each of the at least two magnetic field sensor elements and the permanent magnet to vary during a rotation of the rotatable shaft around the rotation axis.

2. The rotation angle sensing device according to claim 1, wherein the magnetic field source is fixed on the rotatable shaft and the magnetic field source comprises at least one of:
a ring magnet; or
an injection molded ferrite.

3. The rotation angle sensing device according to claim 1, wherein the magnetic field source comprises at least one region of homogeneous axial magnetization, which is not rotationally symmetric to the rotation axis.

4. The rotation angle sensing device according to claim 1, wherein the magnetic field source has a homogenous magnetization in a direction along a thinnest dimension of the magnetic field.

5. The rotation angle sensing device according to claim 1, wherein the at least two magnetic field sensor elements are located in a same plane, which is perpendicular to the rotation axis.

6. The rotation angle sensing device according to claim 1, wherein at least three magnetic field sensor elements are substantially equally distributed across a circle around the rotation axis.

7. The rotation angle sensing device according to claim 1, wherein the at least two magnetic field sensor elements are positioned on the mid-plane at a radial clearance to the magnetic field source.

8. The rotation angle sensing device according to claim 7, wherein a center of gravity of a respective magnetic field sensor element is positioned on the mid-plane.

9. The rotation angle sensing device according to claim 8, wherein the at least two magnetic field sensor elements are positioned not on the mid-plane, and
wherein the at least two magnetic field sensor elements are positioned above or below the mid-plane at a radial distance from the rotation axis which is smaller than half of a maximum diameter of the magnetic field source, thereby having an axial clearance to at least one of a top surface or a bottom surface of the permanent magnet.

10. The rotation angle sensing device according to claim 9, wherein the axial clearance is between 1 mm and 5 mm.

11. The rotation angle sensing device according to claim 1, wherein the magnetic field source has at least one of:
a maximum diameter between 10 mm and 100 mm;
a thickness in an axial direction below 10 mm;
a constant thickness in the axial direction or a varying thickness in the axial direction; or
a center of gravity that lies on the rotation axis.

12. The rotation angle sensing device according to claim 1, wherein the magnetic field source comprises:
at least one first portion of homogeneous axial magnetization, and
at least one second portion of less, different, or no magnetization,
wherein the at least one first portion and the at least one second portion are not rotational symmetric with regard to the rotation axis.

13. The rotation angle sensing device according to claim 1, wherein the magnetic field source comprises:
at least one first portion of a first homogeneous axial magnetization, and
at least one second portion of a second homogeneous axial magnetization,
wherein the at least one first portion and the at least one second portion are magnetized in an anti-parallel direction, and
wherein the at least one first portion and the at least one second portion are not rotational symmetric with regard to the rotation axis.

14. The rotation angle sensing device according to claim 1, wherein the at least two magnetic field sensor elements are configured to provide output signals that are proportional to an axial component of the magnetic field of the magnetic field source; and
wherein the rotation angle sensing device comprises a processing device that is arranged to combine the output signals of the at least two magnetic field sensor elements to determine a rotational angle of the rotatable shaft.

15. The rotation angle sensing device according to claim 14, wherein the processing device is configured to determine a corrected rotation angle according to $$\varphi''=\varphi'+f(\varphi')$$

wherein $\varphi''$ is the corrected rotation angle of the rotatable shaft, $\varphi'$ is a previously determined rotational angle, and $f(\varphi')$ is a correction term, which considers N periods in a full 360° revolution of the rotatable shaft, with N being a number of the at least two magnetic field sensor elements.

16. The rotation angle sensing device according to claim 1, wherein at least one of the at least two magnetic field sensor elements is one of:
a magnetoresistive (MR) sensor;
an anisotropic magnet resistance (AMR) sensor;
a giant magnetoresistance (GMR) sensor;
a tunnel-magnetoresistance (TMR) sensor;
a Hall plate; or
a vertical Hall effect device.

17. A method for sensing a rotational angle of a rotatable shaft that is arranged rotatably around a rotation axis, wherein a magnetic field source is capable of being mechanically coupled to the rotatable shaft via a holder, wherein the magnetic field source provides a magnetization which is substantially parallel to the rotation axis and not rotationally symmetric to the rotation axis, wherein the magnetic field source has a mid-plane that is arranged perpendicular to the rotation axis, wherein a geometry of the magnetic field source shows mirror symmetry with regard to the mid-plane, wherein the magnet field source comprises or is a permanent magnet, the method comprising:
detecting a magnetic field of the magnetic field source by at least two magnetic field sensor elements, wherein the at least two magnetic field sensor elements are located out of the rotatable shaft and are placed at a same radial distance from the rotation axis, wherein the holder is configured to mount the magnetic field source to the rotatable shaft to create an eccentricity that is based on a center of the magnetic field source being offset from a center of the rotatable shaft, and wherein the eccentricity is configured to cause a distance between each of the at least two magnetic field sensor elements and the permanent magnet to vary during a rotation of the rotatable shaft around the rotation axis.

18. The method according to claim 17, further comprising:
providing output signals by the at least two magnetic field sensor elements, wherein the output signals are proportional to an axial component of the magnetic field of the magnetic field source; and
combining the output signals of the at least two magnetic field sensor elements to determine the rotational angle of the rotatable shaft.

19. The method according to claim 17, further comprising:
determining a corrected rotation angle according to $$\varphi''=\varphi'+f(\varphi')$$

wherein $\varphi''$ is the corrected rotation angle of the rotatable shaft, $\varphi'$ is a previously determined rotational angle, and $f(\varphi')$ is a correction term, which considers N periods in a full 360° revolution of the rotatable shaft, with N being a number of the at least two magnetic field sensor elements.

20. The method according to claim 17, wherein the magnetic field source comprises:
at least one first portion of homogeneous axial magnetization, and
at least one second portion of less, different, or no magnetization,
wherein the at least one first portion and the at least one second portion are not rotational symmetric with regard to the rotation axis.

21. A rotation angle sensing device comprising:
a magnetic field source that is capable of being mechanically coupled to a rotatable shaft via a holder,
wherein the rotatable shaft is rotatable around a rotation axis,
wherein the magnetic field source provides a magnetization which is substantially parallel to the rotation axis and not rotationally symmetric to the rotation axis,
wherein the magnetic field source comprises at least one region of homogeneous axial magnetization, which is not rotationally symmetric to the rotation axis, and
wherein the magnet field source comprises a permanent magnet; and
at least two magnetic field sensor elements arranged to detect a magnetic field of the magnetic field source,
wherein the at least two magnetic field sensor elements are located out of the rotatable shaft and are placed at a same radial distance from the rotation axis,
wherein the holder is configured to mount the magnetic field source to the rotatable shaft to create an eccentricity that is based on a center of the magnetic field source being offset from a center of the rotatable shaft, and
wherein the eccentricity is configured to cause a distance between each of the at least two magnetic field sensor elements and the permanent magnet to vary during a rotation of the rotatable shaft around the rotation axis.

* * * * *